(No Model.)
C. C. CLIFTON.
ICE HOUSE.
No. 538,441. Patented Apr. 30, 1895.
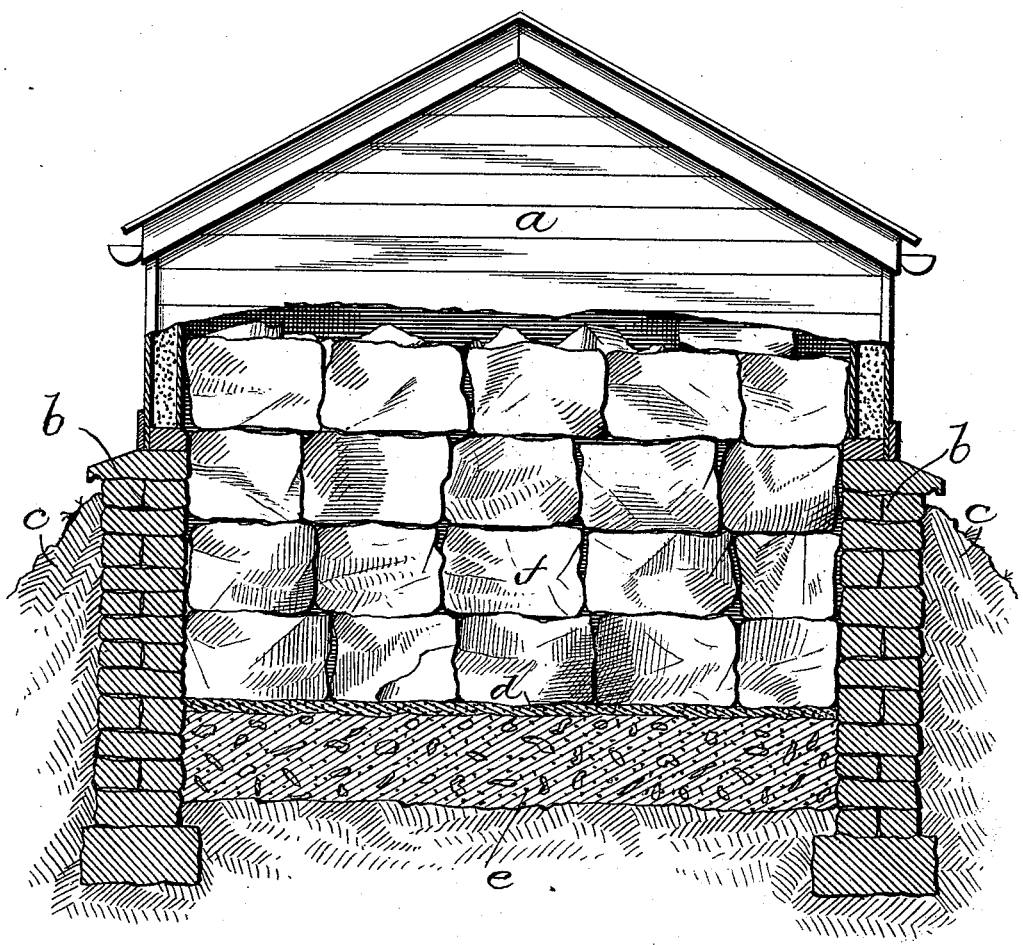
Witnesses
Inventor
Charles C. Clifton
Attorney

UNITED STATES PATENT OFFICE.

CHARLES C. CLIFTON, OF WASHINGTON, IOWA.

ICE-HOUSE.

SPECIFICATION forming part of Letters Patent No. 538,441, dated April 30, 1895.

Application filed November 16, 1894. Serial No. 528,996. (No model.)

*To all whom it may concern:*

Be it known that I, CHARLES C. CLIFTON, a citizen of the United States, residing at Washington, in the county of Washington and State of Iowa, have invented certain new and useful Improvements in Ice-Houses; and I do declare the following to be a full, clear, and exact description of the invention, such as will enable others skilled in the art to which it appertains to make and use the same, reference being had to the accompanying drawing, and to the letters of reference marked thereon, which forms a part of this specification.

My invention relates to an improvement in ice houses, cold storage buildings and other similar places; and my object is to overcome the loss or wastage which usually occurs to the bottom layer or lower portion of ice in such store houses.

In nearly all of the ice houses, or cold storage buildings provided with ice, some kind of drainage is provided for the melted ice, but in my device I dispense entirely with such drainage and close all the interstices in the bottom layer of frozen material, in order to cut off all possibility of ventilation at the bottom, and construct a practically air-tight floor, composed of material which is either naturally or artificially frozen. This frozen floor is, by preference, located at a suitable depth below the ground, and surrounded by a building made waterproof and thoroughly protected from the elements. Upon this frozen floor may be placed a light covering of sawdust, ice packing material or other suitable dividing agent, whereby the house will be ready for the reception of the ice to be stored in the customary way.

In the drawing the figure shows a vertical section partly in elevation.

The reference letter *a* denotes an ordinary ice house, which is set down in the ground a short distance below the surface as usual, and the foundation *b*, protected against the inflow of surface water by an embankment *c* thrown up around it. Upon the ground within the house is laid a floor *e* composed of a mixture of wet concrete, such as loam, clay, muck, sand, gravel, cinders or any other material mixed with water and susceptible of being frozen so as to form a solid, imperforate substance through which air or water cannot pass. This frozen floor should be laid on a level with, or slightly below the outside natural surface of the ground. The freezing may be performed either by natural or artificial means. On the top of this frozen mass is placed the light covering *d*, of sawdust or other packing material, and on this covering the ice *f* is stored.

The absence of any lower drainage openings or ventilating passages, through the floor or bottom of the inclosure, excludes the heat from below and also prevents the downward escape of cold air.

The advantage of placing a light covering of sawdust on the frozen floor is to allow the ice to be easily removed therefrom; otherwise it might become frozen to it.

The process of refilling the ice house each year merely requires the cleaning off of the floor, freezing it again and recovering it lightly with sawdust.

Care should always be taken that the floor be well frozen before the ice is packed upon it.

By this means it will be seen that an ice house is provided with a solid air tight frozen floor for the ice to rest upon.

Having thus described my invention, what I claim as new, and desire to secure by Letters Patent, is—

1. An ice house or inclosure provided with an airtight frozen floor, and having its lower portion free from drainage ducts or ventilating openings, substantially as described.

2. An ice storing inclosure made air-tight at the base and vertical sides and provided with an air tight frozen floor free from drainage or ventilating openings whereby the exterior atmosphere is excluded, substantially as described.

In witness whereof I affix my signature in presence of two witnesses.

CHARLES C. CLIFTON.

Witnesses:
W. M. KEELEY,
H. E. KEELEY.